United States Patent [19]

Rhyan

[11] 4,257,545

[45] Mar. 24, 1981

[54] SHOPPING BASKET FOR A WHEELCHAIR

[75] Inventor: William C. Rhyan, Ft. Lauderdale, Fla.

[73] Assignee: Clarke Carrier Corporation, Ft. Lauderdale, Fla.

[21] Appl. No.: 34,729

[22] Filed: Apr. 30, 1979

[51] Int. Cl.³ ................................................ B60R 9/00

[52] U.S. Cl. ................................... 224/42.43; 224/41; 224/42.44

[58] Field of Search ............ 224/273, 30 A, 42, 42.43, 224/42.44, 41; 220/19

[56] References Cited

U.S. PATENT DOCUMENTS

| | | | |
|---|---|---|---|
| 2,558,372 | 6/1951 | Nidermayer, Jr. | 224/42.43 |
| 3,054,638 | 9/1962 | Johnson et al. | 224/42.44 X |

FOREIGN PATENT DOCUMENTS

| | | | |
|---|---|---|---|
| 601487 | 3/1926 | France | 224/41 |

*Primary Examiner*—Steven M. Pollard
*Attorney, Agent, or Firm*—Birch, Stewart, Kolasch & Birch

[57] ABSTRACT

A shopping basket for use with a wheelchair which comprises:

a basket means adapted to contain shopping items;

locking arm means operatively attached to the basket means to provide locking engagement with the wheelchair; and support means operatively attached to the basket means for engagement with the wheelchair to provide support in substantially the vertical direction.

6 Claims, 6 Drawing Figures

SHOPPING BASKET FOR A WHEELCHAIR

BACKGROUND AND SUMMARY OF THE INVENTION

The present invention is directed to a shopping basket which is provided for use with a wheelchair. More particularly, the present invention is directed to a shopping basket which can be attached to a wheelchair or detached from a wheelchair by an occupant who is sitting in a wheelchair.

Wheelchairs are manufactured throughout the world for use by older persons, by persons who are physically disabled, and by patients recuperating from illnesses of one type or another. The fact that a person is confined to a wheelchair for one reason or another does not eliminate the requirement and need of a handicapped person from fulfilling certain necessary everyday living requirements, such as for example conducting certain shopping ventures to take care of a number of personal needs. Being able to take care of certain personal needs without depending upon others also has its therapeutic value in providing the handicapped person with a certain amount of independence and associated emotional rehabilitation.

Accordingly, an object of the present invention is to provide a shopping basket which can be utilized by a person confined to a wheelchair.

Another object of the present invention is to provide a shopping basket which can be readily secured to a wheelchair so that the shopping basket and the wheelchair can be manipulated as a unitary construction.

A further object of the present invention is to provide a shopping basket which can be readily and securely attached to a wheelchair and detached from a wheelchair with little stress on the part of the occupant of the wheelchair.

Still another object of the present invention is to provide a shopping basket stand which is adapted to support a shopping basket in such a manner to enable the occupant of a wheelchair to easily manipulate the shopping basket from the shopping basket stand into an engaging position with the wheelchair and then, in turn, disengage the shopping basket from the wheelchair and return it to the shopping basket stand.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, the above-objects of the present invention have been satisfied by providing a shopping basket with locking arm mechanisms which are operatively attached thereto to provide locking engagement with part of the structure of the wheelchair. Advantageously, the locking arm mechanism is spring biased so that the locking arm can be pressed into locking engagement with the wheelchair by pressing the locking arm against its spring bias. Once the locking arm mechanism is in position, it is held firmly to the wheelchair by the spring bias of this mechanism. Alternatively, the locking arm mechanism is pivotally attached to the shopping basket so that it can merely be pivoted to an open position and then fastened in a closed position around a portion of the wheelchair. The locking arm mechanism extends in substantially the horizontal direction thereby providing horizontal support to the shopping basket. To facilitate the operation of the locking mechanism a hand release element which, for example, can be a chain or a cord-like member is attached to the locking arm mechanism disposed on opposite sides of the shopping basket so that by the pulling of the hand release element toward the occupant sitting in the wheelchair, the locking arm mechanism can be released by causing it to pivot about its pivot point with the shopping basket.

The shopping basket is also provided with a vertical-type support member which extends from the bottom of the shopping basket and is adapted to attach to the wheelchair below the locking arm mechanism and directly above the tubing which supports the footplates of the wheelchair. This support member is not a locking device, as in the case of the locking arm mechanism but rather can be a horseshoe of a U-shaped element which engages the vertical member of the armrest and rests upon the flat surface of the footplate support member. The weight of the basket and the merchandise placed therein prevent the support member of the basket from disengaging and the weight of the basket also puts pressure against the locking arms when they are engaged with the wheelchair which keeps them securely in place.

To facilitate the mounting of the shopping basket to the wheelchair, a self-standing shopping basket stand is provided for holding two shopping baskets. In order to attach a shopping basket to a wheelchair the occupant in the wheelchair positions himself directly in front of the shopping basket positioned on the stand. Then the wheelchair is slowly rolled forward until the vertical support legs seat firmly on the wheelchair. The brakes of the wheelchair are then locked. The shopping basket is then grasped by the occupant of the wheelchair and pulled toward the chair until the locking arms are securely locked around the wheelchair tubing. Then the brakes of the wheelchair can be released and the wheelchair can be rolled away from the stand.

To release the shopping basket from the wheelchair, the occupant of the wheelchair is positioned directly in front of the stand. The wheelchair is then rolled slowly forward until the basket extends over the horizontal supports of the shopping basket stand. The brakes on the wheelchair are then locked. The top edge of the shopping basket is then pulled with one hand about two inches toward the occupant of the wheelchair and while still holding the basket in this position, the other hand of the occupant is utilized to pull the release chain so that the locking arms swing clear of the tubing on the wheelchair. The occupant then allows the basket to go forward onto the extended horizontal stand support and further pushes the basket onto the stand as far as it will go. The brakes of the wheelchair are then released and the wheelchair can be reversed from the stand.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
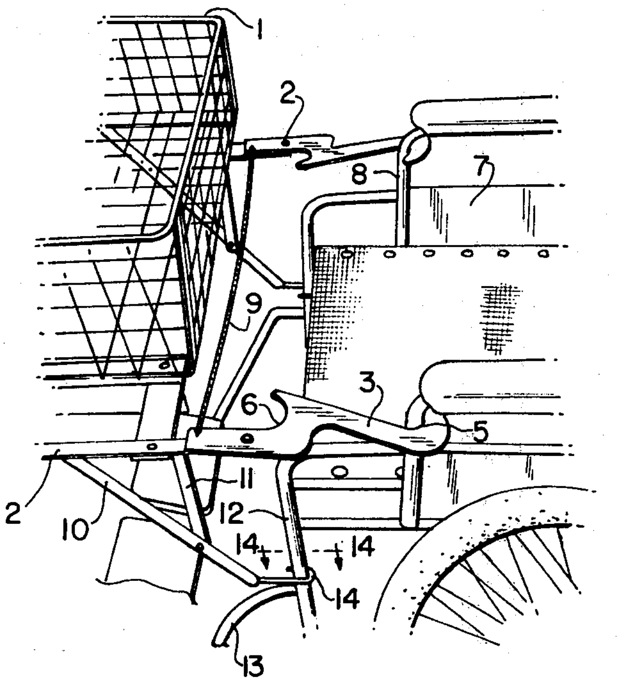
FIG. 1 shows the shopping basket of the present invention attached to a wheelchair.

The present invention will now be discussed in connection with the drawings wherein like reference numerals are used in the various views to designate like elements.

Figure 3:
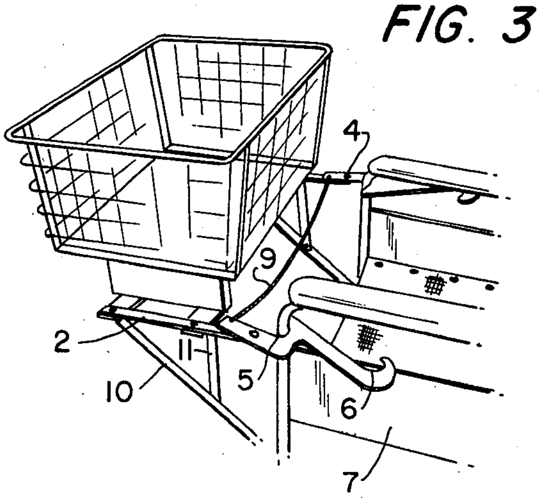
FIG. 3 shows the shopping basket of the present invention wherein a different portion of the locking arm is utilized to engage the shopping basket to a straight arm-type wheelchair as distinguished from a desk-type wheelchair as shown in FIG. 1.

The shopping basket of the present invention, which has been adapted to be used with a wheelchair comprises a basket 1 which is provided with a framework 2, to which the locking arm mechanism 3 is pivotally attached by pivot element 4. The locking arm mechanism 3 is provided with two hook-like portions 5 and 6 which renders the shopping basket attachable to both a straight arm wheelchair as shown in FIG. 3 or a desk type wheelchair as shown in FIG. 1. Thus, for a straight arm wheelchair the hook-like member 5 of the locking arm mechanism can be utilized and for a desk-type wheelchair the hook-like member 6 of the locking arm mechanism can be utilized. This particular type of locking arm mechanism also enables the occupant of the wheelchair to adjust the distance between the wheelchair itself and the shopping basket. The wheelchair 7 is provided with standard tubing members 8 which are utilized for securing the locking arm mechanism to the wheelchair.

Figure 2:
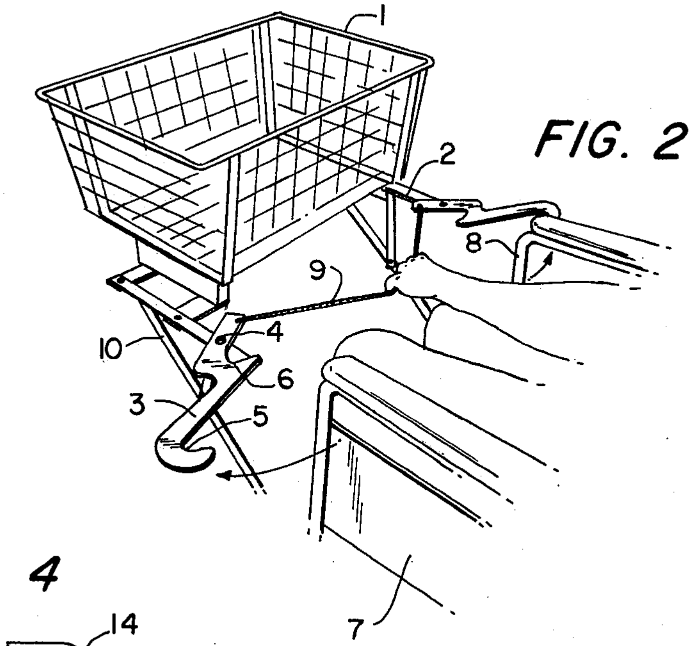
FIG. 2 shows the shopping basket of the present invention wherein the locking arms are disengaged from the wheelchair by the occupant.

Advantageously, the locking arm mechanism is spring actuated or spring biased so that the engaging operation wherein the locking arm mechanism becomes engaged with the tubular member 8, the locking arm mechanism is forced to open up against the bias by pivoting around pivot point 4 and then is locked in position around the tubular member 8 by the force of the spring bias of the locking arm. A hand release element 9 is provided to connect the locking arm mechanism on each side of the shopping basket so that the occupant can readily disengage the locking arm mechanism from the tubular members 8. Thus the occupant of the wheelchair merely has to grasp the top edge of the basket with one hand and pull the basket toward the wheelchair a sufficient distance to clear the hook-like portion of the locking arm mechanism from the tubular member 8 and while still holding on to the basket pull the hand release element toward the wheelchair in the manner shown in FIG. 2. The pulling of the hand release element causes the locking arm mechanism to pivot outwardly about pivot point 4 against its bias, thereby freeing the shopping basket from the wheelchair. The hand release member can be any kind of connecting element, such as for example a chain, or a cord-like member which can be made of any type of natural or synthetic material. Also, although the locking arm mechanisms are advantageously shown to be spring biased, it is readily apparent that the locking arms can be constructed without being spring biased and thus could be modified so as to be locked in position once the arms have been engaged around the tubular members 8.

Figure 4:
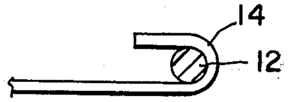
FIG. 4 shows a sectional view of how the vertical support member engages the tubing of the lower portion of the wheelchair.

The shopping basket of the present invention is also provided with a support member 10 which is attached to the framework 2 and extends below the shopping basket to provide support for the shopping basket in the vertical direction. Thus the vertical support member 10 is adapted to attach to the substructure 12 of the wheelchair directly above the tubing 13 which supports the footplates of the wheelchair. This supporting element is not a locking device but rather a horseshoe or U-shaped element 14 which engages the vertical member 12 of the armrest and abuts against the flat surface of the footplate support member. The weight of the shopping basket and the merchandise placed in the shopping basket inhibits the basket from disengaging and furthermore the weight of the basket also applies pressure against the locking arms when they are engaged, which keeps them securely in place. The U-shaped element 14 of the vertical support member is shown in cross-section in FIG. 4. It is readily apparent that the vertical support member 10 can be provided with any type of configuration of its engaging end portion as long as the configuration enables sufficient engagement with the vertical support member. FIG. 3 shows the embodiment of the present invention wherein the hook-like portion 5 of the locking arm mechanism 3 is utilized to provide engagement of the shopping basket with a wheelchair containing a straight arm configuration. Obviously, the nature of the double hook-like configuration of the locking arm mechanism also enables the occupant of the wheelchair to vary the distance between the shopping basket and the wheelchair.

Figure 5:
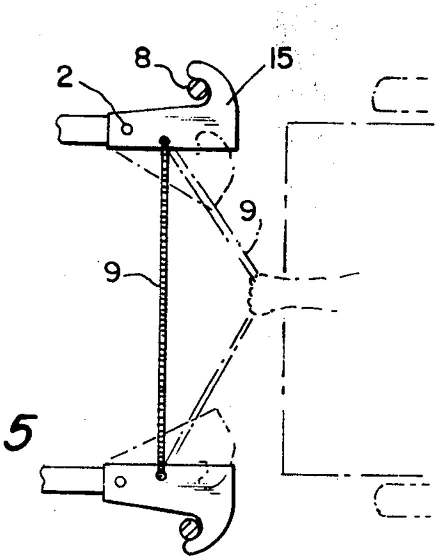
FIG. 5 shows another embodiment of the locking arm mechanism which can be utilized in the shopping basket of the present invention.

FIG. 5 shows another embodiment of the locking arm mechanism of the present invention wherein the hook-like members of the locking arm mechanism 15 are adapted to engage the tubular elements 8 of the wheelchair by pivoting about pivot 4 toward the inside of the wheelchair rather than away from the wheelchair as shown in FIG. 1. The locking arm mechanism of FIG. 5 is also spring biased and can be readily manipulated by the hand releasing element to disengage the locking arm mechanisms from the tubular elements 8.

Figure 6:
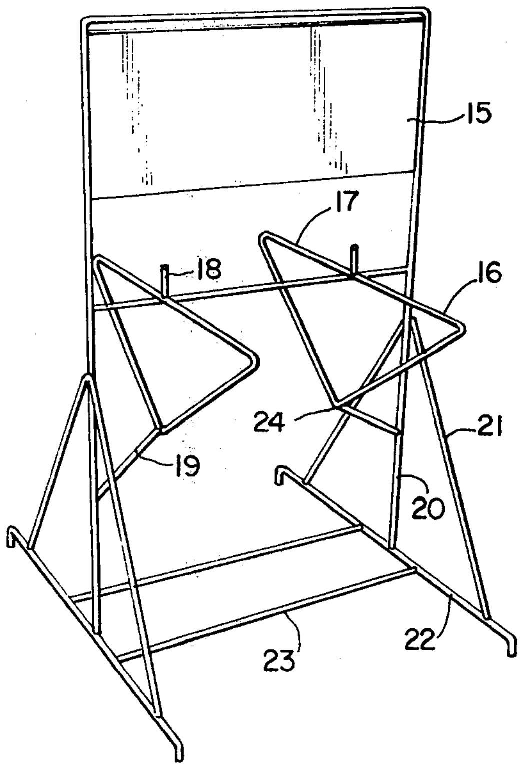
FIG. 6 shows a shopping basket stand which is adapted to support at least one shopping basket.

FIG. 6 shows a self-supporting stand 15 which is made to accommodate two shopping baskets placed back to back on the stand. The shopping basket stand 15 includes vertical support members 20, and horizontal support members 16 and 17 extending from opposite sides of the vertical support member, respectively. Horizontal support members 16 and 17 are provided to receive two shopping baskets disposed in a back-to-back relationship and separated by stop members 18. The horizontal members 16 and 17 are supported by element 19 at a common point 24. The vertical support members 20 are further provided with base members 22 which are connected together by elements 23. The stability and strength of the shopping basket stand is further strengthened by elements 21 which connect the vertical members 20 with the base members 22 on both sides of the shopping basket stand.

All of the elements of the shopping basket and shopping basket stand can be made of either metal, a molded plastic, such as for example acrylonitrile-butadiene-styrene polymer or any other material which can provide the same properties of either metal or plastic.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shopping basket for use with a wheelchair which comprises:

a basket means adapted to contain shopping items;

locking arm means operatively attached to the basket means to provide locking engagement with the wheelchair said locking arm means including opposing, spring-biased, engaging members extending from one end of the basket means;

hand release means attached to the locking arm means, the operation of the hand release means functioning to act against the spring bias of the locking arm means for releasing said locking engagement with the wheelchair; and support means operatively attached to the basket means for engagement with the wheelchair to provide support in substantially the vertical direction.

2. The shopping basket of claim 1, wherein each engaging member comprises at least one hook-like member.

3. The shopping basket of claim 1, wherein each engaging member comprises two hook-like members for selectively varying the distance between the shopping basket and the wheelchair.

4. The shopping basket of claim 1, wherein the support means is provided with a non-locking engaging end portion.

5. The shopping basket of claim 4, wherein the non-locking, engaging end portion has a substantially U-shaped configuration.

6. A shopping basket for use with a wheelchair which comprises:

a basket means adapted to contain shopping items;

two locking arm means operatively attached to the basket means and extending at opposite sides from one end of the basket means for locking engagement with an upper portion of the wheelchair;

hand release means attached to the locking arm means for releasing said locking engagement with the wheelchair; and support means operatively attached to the basket means and extending below the locking arm means for non-locking engagement with a lower portion of the wheelchair.

* * * * *